US012677016B1

(12) United States Patent
Aruldoss et al.

(10) Patent No.: US 12,677,016 B1
(45) Date of Patent: Jul. 7, 2026

(54) ANALYZING GROUPS OF SIMILAR STREAMS OF MEDIA CONTENT

(71) Applicant: Amazon Technologies, Inc., Seattle, WA (US)

(72) Inventors: Roman Akash Aruldoss, London (GB); Andrew Collins, Eversley (GB); Marcin Kolny, London (GB); Yaron Torbaty, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 193 days.

(21) Appl. No.: 18/061,821

(22) Filed: Dec. 5, 2022

(51) Int. Cl.
*H04N 21/24* (2011.01)
*H04N 21/2662* (2011.01)

(52) U.S. Cl.
CPC ..... *H04N 21/2402* (2013.01); *H04N 21/2405* (2013.01); *H04N 21/2662* (2013.01)

(58) Field of Classification Search
CPC .......... H04N 21/2402; H04N 21/2405; H04N 21/2662
See application file for complete search history.

(56) References Cited

U.S. PATENT DOCUMENTS

| | | | | |
|---|---|---|---|---|
| 6,675,174 | B1 * | 1/2004 | Bolle | G06V 20/40 |
| | | | | 707/999.102 |
| 2010/0157070 | A1 * | 6/2010 | Mohanty | H04N 23/68 |
| | | | | 348/208.1 |
| 2019/0042853 | A1 * | 2/2019 | Kerl | H04N 21/23418 |
| 2019/0342594 | A1 * | 11/2019 | Korte | H04N 17/004 |
| 2021/0112306 | A1 * | 4/2021 | Ye | H04N 21/4542 |
| 2022/0400300 | A1 * | 12/2022 | Blythe | H04N 21/23418 |

OTHER PUBLICATIONS

Li, Zhi, et al. "Toward a Practical Perceptual Video Quality Metric," Netflix Technology Blog, www.netflixtechblog.com, Jun. 6, 2016.
Orduna, Marta, et al. "Video multimethod assessment fusion (VMAF) on 360VR contents." IEEE Transactions on Consumer Electronics 66.1 (2019): 22-31.

* cited by examiner

*Primary Examiner* — Chenea Davis
(74) *Attorney, Agent, or Firm* — Athorus, PLLC

(57) ABSTRACT

Multiple streams of media are analyzed for defects by synchronizing the streams in time and generating hashes or other representations of images of the respective streams. Where the hashes or other representations of two or more streams are sufficiently similar to one another, the streams may be determined to be similar to one another, and a determination as to whether each of the streams is defective may be made by analyzing just one of the streams. Where the hashes or other representations of two or more streams are not sufficiently similar to one another, a determination as to whether each of the streams is defective may be only made by analyzing all of the streams independently.

20 Claims, 11 Drawing Sheets x • y • z VIDEO STREAMS GENERATED AND TRANSMITTED TO CONTENT DELIVERY NETWORK x • y • z VIDEO STREAMS GENERATED AND TRANSMITTED TO CONTENT DELIVERY NETWORK

ANALYZING GROUPS OF SIMILAR STREAMS OF MEDIA CONTENT

BACKGROUND

The distribution of video programming such as television shows or movies over computer networks, such as the Internet, has become more commonplace in recent years. Historically, video programs were primarily transmitted over the air to televisions from terrestrial antennas, and on analog channels residing at designated frequencies within very high frequency (or "VHF") or ultrahigh frequency (or "UHF") levels or bands. Eventually, cable television emerged as an efficient, antenna-free manner for delivering programming to television systems using radiofrequency signals over a coaxial cable, via a converter box. The advent of digital television and digitally encoded programming greatly increased both the number of programs that could be simultaneously made available to a television system, as well as the levels of resolution at which such programs may be displayed.

Today, advancements in technology enable live programs to be transmitted to devices or systems over one or more networks, which may include the Internet in whole or in part. Where one or more cameras or other imaging devices are provided at an event or a location of interest, imaging data and accompanying audio signals captured by such devices may be processed using multiple encoders to concurrently generate streams of the imaging data and audio signals, which may be duplicated for transmission at various levels of quality or resolution, and configured for receipt and display by way of any number of applications or devices, subject to unique or individual formatting requirements. Each of such streams may be transmitted to a content distribution network (or a content delivery network) for transmission to users of such applications or devices.

Streams of video content or multimedia that are transmitted to users over computer networks must be processed to determine whether any of such streams includes one or more audible or visual defects or errors, such as blurring, audio drop-outs, blocky images, or others. In order to determine that each of such streams is free of defects or errors, each of such streams must typically be decrypted and decoded, and subjected to one or more processing-intensive operations to determine whether any of such streams includes or features contains defects or errors that users may see or hear.

DETAILED DESCRIPTION

As is set forth in greater detail below, the present disclosure is directed to systems and methods for analyzing streams of media content. More specifically, where media (e.g., video images and audio signals) is captured using one or more cameras or other imaging devices at an event or a location of interest, or received from any media source, the media may be encoded to generate multiple streams for redundancy or efficiency, and also at varying levels of quality or resolution. Such streams may be formatted for presentation on systems of users by one or more discrete devices or applications. As the streams of images are transmitted to systems of users, the streams may be synchronized to align their respective content in time, and to compare the streams for similarity.

Where the streams are determined to be not similar to one another, each of such streams must be individually processed to determine conditions or statuses of such streams, such as whether such streams contain any defects (e.g., a loss of video, block corruption, frozen video streams, presence of artifacts, audio errors, or others). Where a group of two or more streams are determined to be similar to one another, however, one of the streams in the group may be processed to determine a condition or a status of the stream, such as whether the stream contains any defects, and a determination as to the status or the condition of the stream may be applied to all of the streams of the group.

The systems and methods of the present disclosure may, therefore, simplify processes for evaluating streams of images that are captured and received from live media sources by reducing a number of such streams or such images that must be processed in order to confirm that such streams are free of defects.

Figure 1A:
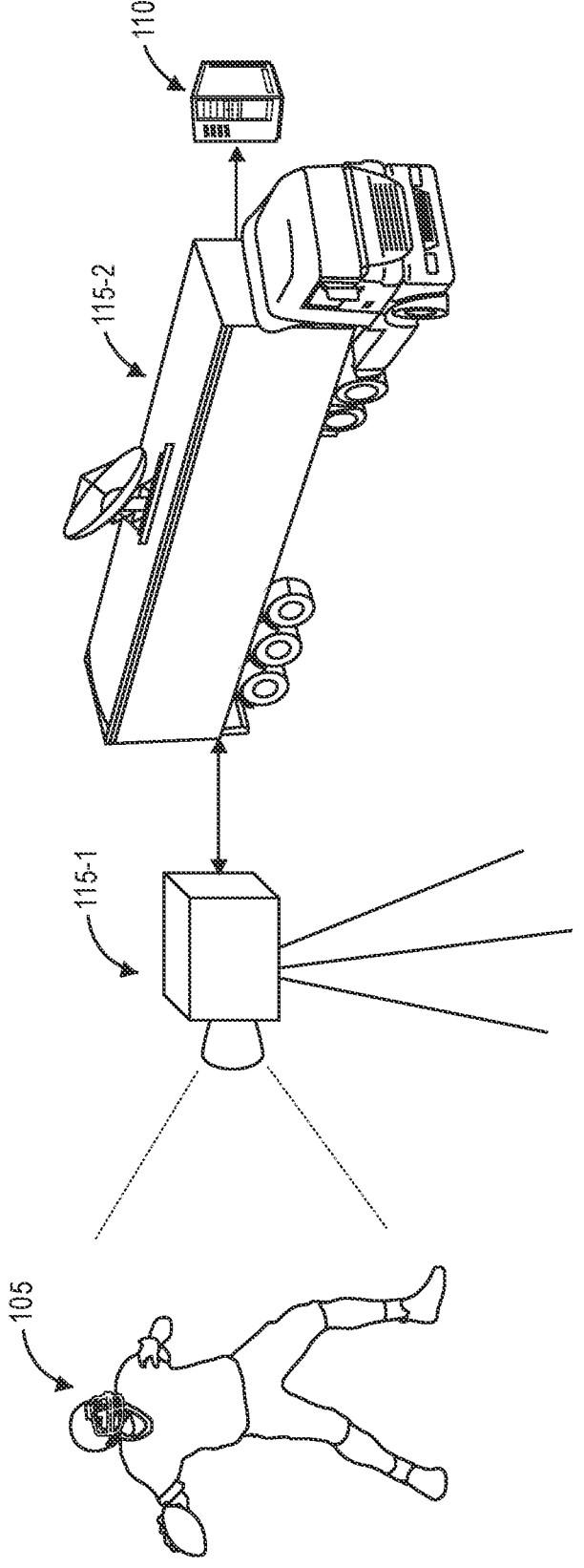
FIGS. 1A through 1F are views of aspects of one system for analyzing streams of media content in accordance with implementations of the present disclosure.

Referring to FIGS. 1A through 1F, views of aspects of one system for analyzing streams of media content in accordance with implementations of the present disclosure are shown. As is shown in FIG. 1A, a camera 115-1 captures video images of an event 105 (e.g., a live sporting event) at a location of interest, as well as any associated audio signals or other information, data or metadata, and transfers media content including the images, audio signals, information, data or metadata to a media distribution system 110 by way of a mobile production facility 115-2 (e.g., a production truck). Alternatively, audio signals or information, data or metadata may be received from microphones or other systems associated with the event 105, independent of the camera 115-1.

The mobile production facility 115-2 may be one or more vehicles or stations having a control room or facility with various processing or communication equipment for analyzing and preparing video images or audio signals for transmission to the media distribution system 110 and, ultimately, to users (e.g., viewers). The mobile production facility 115-2 may further include any number of cameras, support systems, cables, conductors, power sources or connections, microphones, amplifiers or any other systems associated with the capture and transmission of media content.

Alternatively, the media distribution system 110 from any third party sources, e.g., providers of content associated with traditional over-air or cable television programming, on-demand programming, or any other sources, with or without the mobile production facility 115-2. The media distribution system 110 need not receive live media from cameras, microphones or other recording systems.

The media distribution system 110 may be any source or recipient of media content, e.g., still or moving images, audio content or other multimedia, by way of a networked computer infrastructure. The media distribution system 110 may include one or more physical computer servers or data stores (e.g., databases) for hosting a network site (or network sites), or for transmitting images or other video content, audio content or other multimedia to devices or systems of users. For example, the media distribution system 110 may be any individual or entity associated with the broadcasting, airing, streaming or distribution of one or more video and audio files over networks, which may include the Internet in whole or in part, such as an online marketplace, an entertainment company, a video streaming service, a cable television provider, an operator of an over-the-air television station or channel, a social network, an outlet for news or media of any kind, or any like individual or entity.

Although FIG. 1A shows only a single camera 115-1 capturing media at the event 105 or the location of interest, any number of cameras 115-1 may capture images, audio signals, information, data or metadata at the event or location and transmit such images to the media distribution system 110 by way of the mobile production facility 115-2 or any other facility.

Figure 1B:
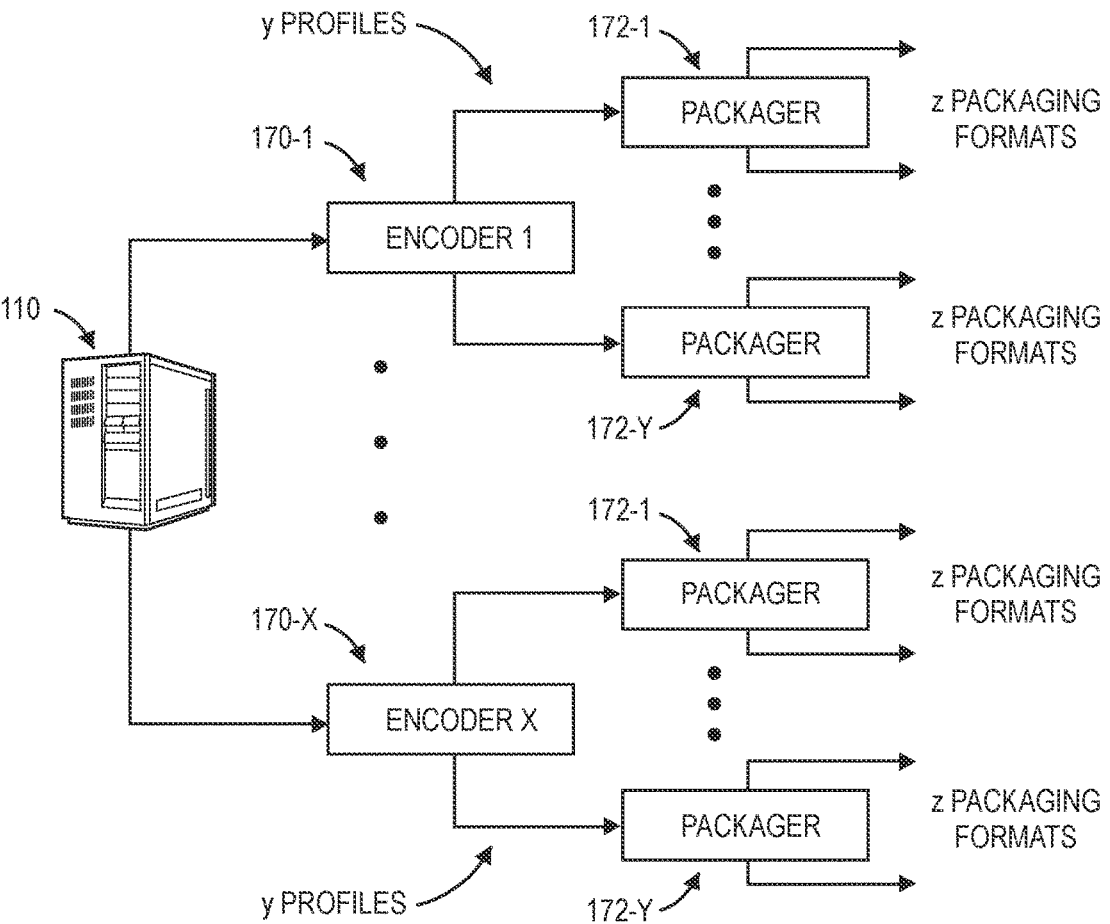

As is shown in FIG. 1B, upon receiving the video images, audio signals, information, data or metadata from the camera 115-1, the media distribution system 110 may process the media using one or more encoders, and generate streams for distribution via a content delivery network or in any other manner. For example, the media distribution system 110 may process the media into discrete streams by any number x encoders 170-1 . . . 170-x, e.g., for redundancy or for any other purpose. In some implementations, the x encoders 170-1 . . . 170-x may be provided in disparate geographic locations or otherwise distributed in a manner to enhance the efficiency by which the media is processed and distributed.

As is shown in FIG. 1B, each of the encoders 170-1 . . . 170-x may generate streams of media according toy profiles, e.g., at different levels of quality or resolution, such as standard definition, high definition, ultra-high definition, or others. Each of the streams in the y profiles generated by the encoders 170-1 . . . 170-x may be provided to one of a plurality of packagers 172-1 . . . 172-y, which may package the streams along with any relevant information, data or metadata to generate z distinct streams in discrete formats for playing via any number of devices (or applications).

Thus, as is shown in in FIG. 1B, media (e.g., video images and any associated audio signals, information, data or metadata) captured by the camera 115-1 or received from another media source may be processed into any number of discrete streams, viz., x•y•z streams, for redundancy, for quality or resolution, or for a diversity of viewing experiences, or for any other purpose, and forward the discrete streams to users by way of a content delivery network.

Previously, in order to determine that a status or a condition of each of a plurality of discrete streams of media was satisfactory, or free of defects (e.g., a loss of video, block corruption, frozen video streams, audio errors, presence of artifacts, or others), each of such streams required individual processing or analysis. In accordance with implementations of the present disclosure, however, groups of the streams of media that are determined to be similar to one another may be identified, and a single stream of each of such groups may be processed or analyzed to determine a status or a condition of that stream, viz., whether that stream is experiencing any defects. A determination as to a status or a condition of one of the streams of similar media of a group, e.g., whether the one of the streams is experiencing defects, or is substantially defect-free, may be applied to each of the streams of the group.

Figure 1C:
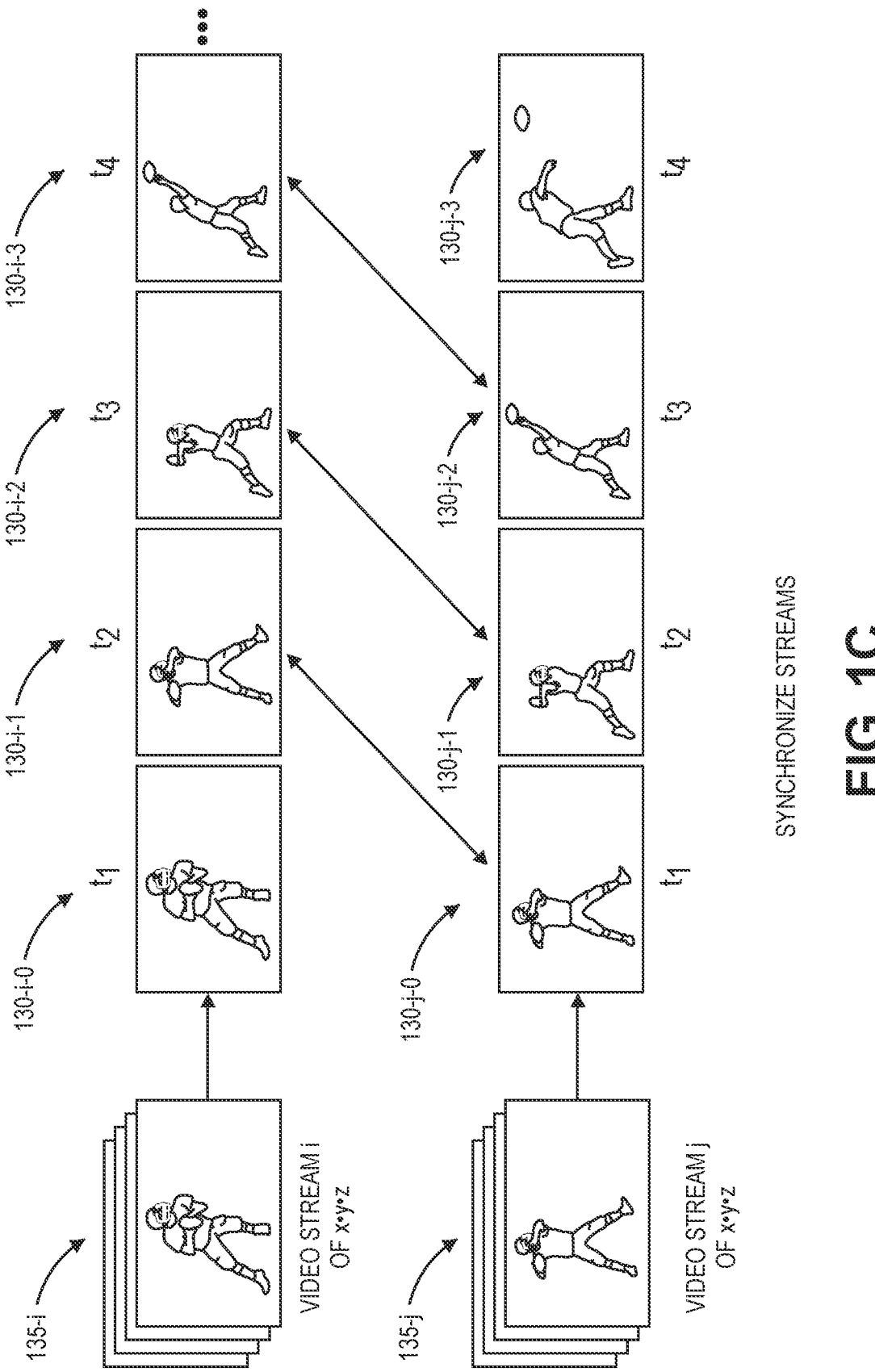

Contents of two or more streams of media may be synchronized, in order to determine whether the streams of media are similar to one another. As is shown in FIG. 1C, individual images 130-i-0, 130-i-1, 130-i-2, 130-i-3 of the video stream i of the x•y•z video streams shown in FIG. 1B along with individual images 130-j-0, 130-j-1, 130-j-2, 130-j-3 of the video stream j of the x•y•z video streams may be processed to determine which of such images 130-i-0, 130-i-1, 130-i-2, 130-i-3 and which of such images 130-j-0, 130-j-1, 130-j-2, 130-j-3 are aligned in time. In particular, and as is shown in FIG. 1B, the image 130-i-1 of the video stream i transmitted at time $t_2$ is deemed to be aligned in time with the image 130-j-0 of the video stream j transmitted at time $t_1$, while the image 130-i-2 of the video stream i transmitted at time $t_3$ is deemed to be aligned in time with the image 130-j-1 of the video stream j transmitted at time $t_2$, and the image 130-i-3 of the video stream i transmitted at time $t_4$ is deemed to be aligned in time with the image 130-j-2 of the video stream j transmitted at time $t_3$.

In some implementations, signal-to-noise ratios may be calculated for pairs of individual ones of the images of the video stream i and individual ones of the video stream j. Where a peak signal-to-noise ratio is identified for a pair of one of the images 130-i-0, 130-i-1, 130-i-2, 130-i-3 and one of the images 130-j-0, 130-j-1, 130-j-2, 130-j-3 of the video streams i, j, content of the pair of images may be determined to be aligned in time, and the video streams i, j, may be synchronized by shifting or otherwise adjusting the images 130-i-0, 130-i-1, 130-i-2, 130-i-3 and the images 130-j-0, 130-j-1, 130-j-2, 130-j-3 with respect to one another.

In some implementations, measures of the structural similarity of images may be determined and used to synchronize the images 130-i-0, 130-i-1, 130-i-2, 130-i-3 and the images 130-j-0, 130-j-1, 130-j-2, 130-j-3, according to a structural similarity index measure, e.g., a perceptron-based model that may predict a level of quality of an image based on a perceived change in structural information regarding the image. For example, distortion of image components such as luminance, contrast and structure of the respective images 130-i-0, 130-i-1, 130-i-2, 130-i-3 and the images 130-j-0, 130-j-1, 130-j-2, 130-j-3 may be determined and compared to one another to determine a level of quality of an image, e.g., by a weighted comparison. Where a maximum structural similarity of a pair of one of the images 130-i-0, 130-i-1, 130-i-2, 130-i-3 and one of the images 130-j-0, 130-j-1, 130-j-2, 130-j-3 of the video streams i, j is identified, content of the pair of images may be determined to be aligned in time, and the video streams i, j, may be synchronized by shifting or otherwise adjusting the images 130-i-0, 130-i-1, 130-i-2, 130-i-3 and the images 130-j-0, 130-j-1, 130-j-2, 130-j-3 with respect to one another.

Alternatively, in some implementations, representations of the respective images 130-i-0, 130-i-1, 130-i-2, 130-i-3 of the video stream i of the x•y•z video streams and the images 130-j-0, 130-j-1, 130-j-2, 130-j-3 of the video stream j may be determined and compared to one another. Where a representation of one of the images 130-i-0, 130-i-1, 130-i-2, 130-i-3 of the video stream i and a representation of one of the images 130-j-0, 130-j-1, 130-j-2, 130-j-3 of the video stream j are sufficiently close to one another, e.g., such that a difference between such representations is less than a predetermined threshold, the images may be deemed to be aligned in time.

Figure 1D:
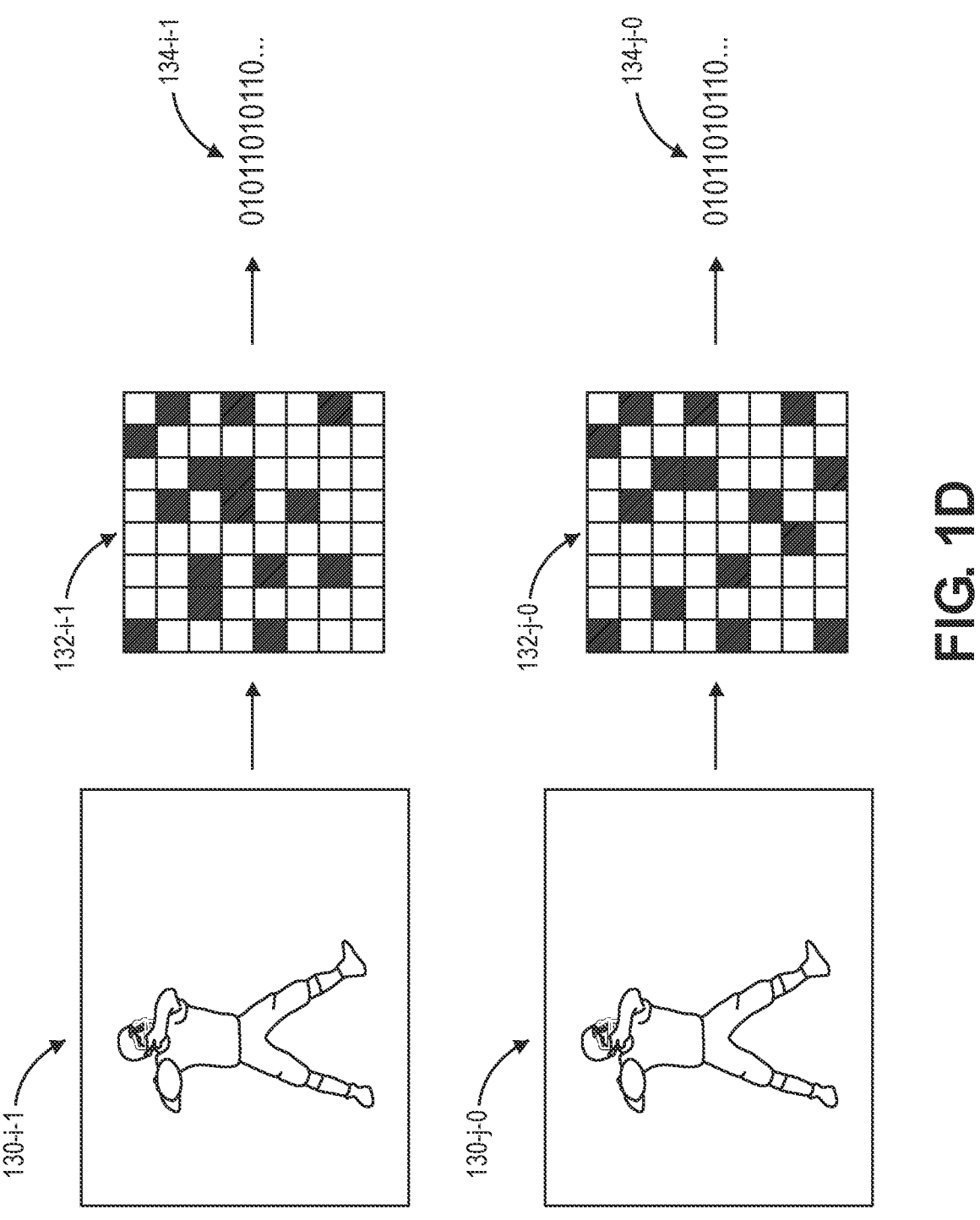

Representations of images of different streams that are synchronized may be calculated and used to determine whether such images are similar to one another. As is shown in FIG. 1D, the image 130-$i$-1 may be processed to generate an image 132-$i$-1 that is reduced in size and/or resolution, and a hash 134-$i$-1 or another representation may be generated from the image 132-$i$-1. Similarly, the image 130-$j$-0 may be processed to generate an image 132-$j$-0 that is reduced in size and/or resolution, and a hash 134-$j$-0 or another representation may be generated from the image 132-$j$-0. For example, in some implementations, the images 130-$i$-1, 130-$j$-0 may be converted to grayscale and downsampled to create the images 132-$i$-1, 132-$j$-0, which may be processed according to a hash algorithm to generate the hashes 134-$i$-1, 134-$j$-0. Each of the hashes 134-$i$-1, 134-$j$-0 may be an average hash, a block hash, a difference hash, a perceptual hash or a wavelet hash.

Representations of images of each of the x•y•z video streams, such as the hashes 134-$i$-1, 134-$j$-0, that are calculated in the manner described above with regard to FIG. 1D may be compared to one another to determine which of the x•y•z video streams are similar, and which of such streams are not similar. For example, where representations 134-1, 134-2 . . . 134-$xyz$ of the x•y•z video streams are calculated based on images of the respective streams, such representations may be processed to identify representations that are within a minimum hamming distance, or threshold, of one another and to allocate streams from which the representations were generated to a common group. One of the video streams of the common group may be processed or analyzed to determine a status or a condition of that stream, such as whether that video stream is experiencing any defects, and a determination as to the status or the condition of that stream, e.g., whether that stream is experiencing a defect, or is defect free, may be applied to each of the video streams in the common group based on the similarity of such streams. Where a representation of the representations 134-1, 134-2 . . . 134-$xyz$ of the x•y•z video streams is not within a minimum hamming distance, or threshold, of any other representations, a video stream from which that representation is generated must be independently processed or analyzed to determine whether a status or a condition of that video stream, such as whether that video stream is experiencing a defect, or is defect-free.

In some implementations, the same algorithms, systems or techniques that are used to synchronize content of streams in time may also be used to determine similarity of the respective streams. For example, in some implementations, streams may be synchronized where peak signal-to-noise ratios, structural similarities or hash values are sufficiently close to one another or greater than a first threshold. Streams may also be determined to be similar to one another where peak signal-to-noise ratios, structural similarities or hash values are sufficiently close to one another or greater than a second threshold that is greater (or more strict) than the first threshold.

Figure 1E:
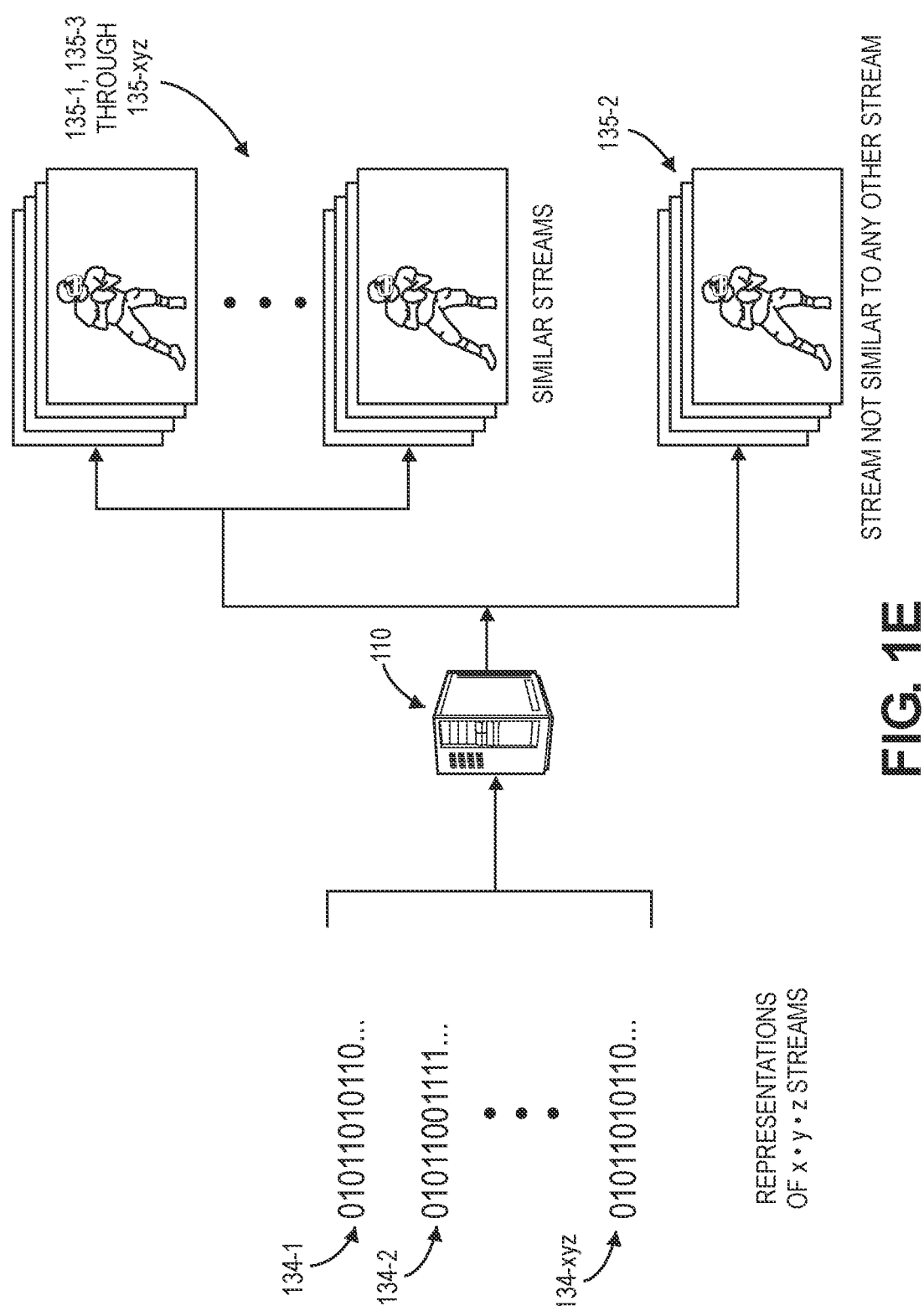

For example, as is shown in FIG. 1E, based on the respective representations 134-1, 134-2 . . . 134-$xyz$ of the video streams 135-1, 135-2 . . . 135-$xyz$, the video streams 135-1, 135-3 . . . 135-$xyz$ are determined to be similar to one another, and the video stream 135-2 is determined to be not similar to any of the video streams 135-1, 135-3 . . . 135-$xyz$.

Figure 1F:
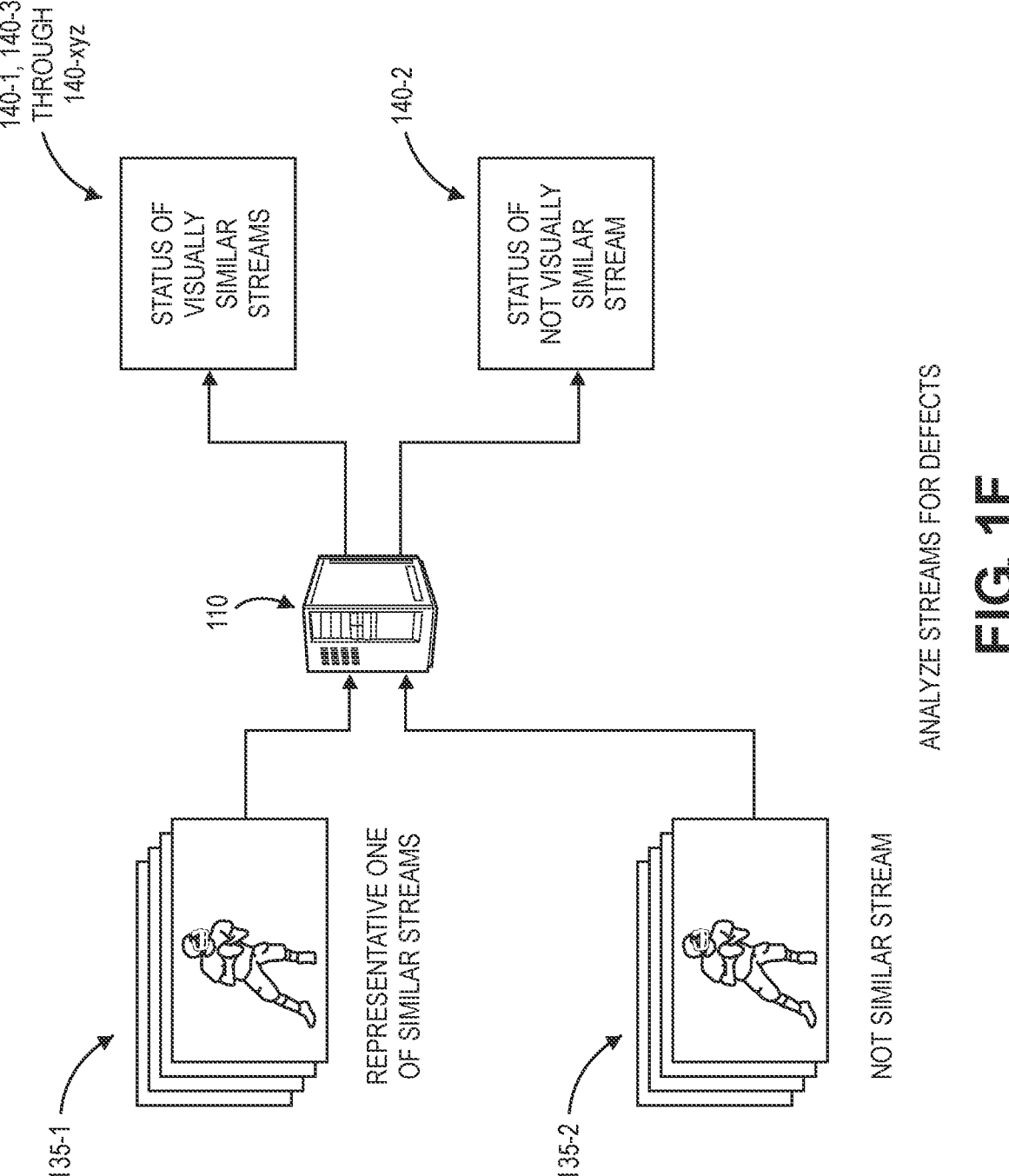

Subsequently, as is shown in FIG. 1F, a representative video stream 135-1 of the x•y•z video streams may be processed or analyzed to determine a status 140-1 or a condition of that video stream 135-1, e.g., whether the video stream 135-1 is experiencing one or more defects, or whether the video stream 135-1 is defect-free. Because the video streams 135-1, 135-3 . . . 135-$xyz$ have been determined to be similar to one another, the status 140-1 of the video stream 135-1 may be applied to each of the other video streams 135-1, 135-3 . . . 135-$xyz$ of the x•y•z video streams that have been determined to be similar to the video stream 135-1, e.g., such that statuses 140-3 . . . 140-$xyz$ are the same as the status 140-1. Likewise, the video stream 135-2 that has been determined to be not similar to the video streams 135-1, 135-3 . . . 135-$xyz$ may also be processed or analyzed to determine a status 140-2 of that video stream 135-2, e.g., whether the video stream 135-2 is experiencing one or more defects, or whether the video stream 135-2 is defect-free.

Accordingly, statuses or conditions of each of the x•y•z video streams may be determined by processing just two of the x•y•z video streams, e.g., a representative one of a group of video streams, viz., the video stream 135-1, that have been determined to be similar to one another based on the representations, and the video stream 135-2, which has been determined to be not similar to any of the video stream of the group. The systems and methods of the present disclosure thereby enable a reduction of streams that must be analyzed to determine whether all of the x•y•z video streams are free of defects, e.g., from a total of x•y•z streams to just two.

Although some implementations of the present disclosure relate to streams of visual imaging data, the system and methods of the present disclosure are not so limited. To the contrary, streams of audio signals, e.g., sounds or other acoustic data, may be processed to determine whether such streams are synchronized, and to determine whether such streams are acoustically similar to one another. For example, in some implementations, portions of audio signals may be synchronized where signal-to-noise ratios calculated based on such portions are determined to be maximized or are peaks, or compared to one another to determine whether such signals are similar to one another. Alternatively, or additionally, portions of audio signals may be synchronized where hashes or other representations of the respective portions are nearest one another, e.g., within a threshold hamming distance, or compared to one another based on such hashes to determine whether such signals are similar to one another. The streams of audio signals may be obtained from any system having one or more acoustic sensors (e.g., a camera or an independent microphone), or from any third party source. In some implementations, the streams of audio signals may accompany streams of video signals, e.g., soundtracks to such signals. Streams of audio signals may be analyzed separately or together with any accompanying streams of video signals in accordance with implementations of the present disclosure.

Figure 2:
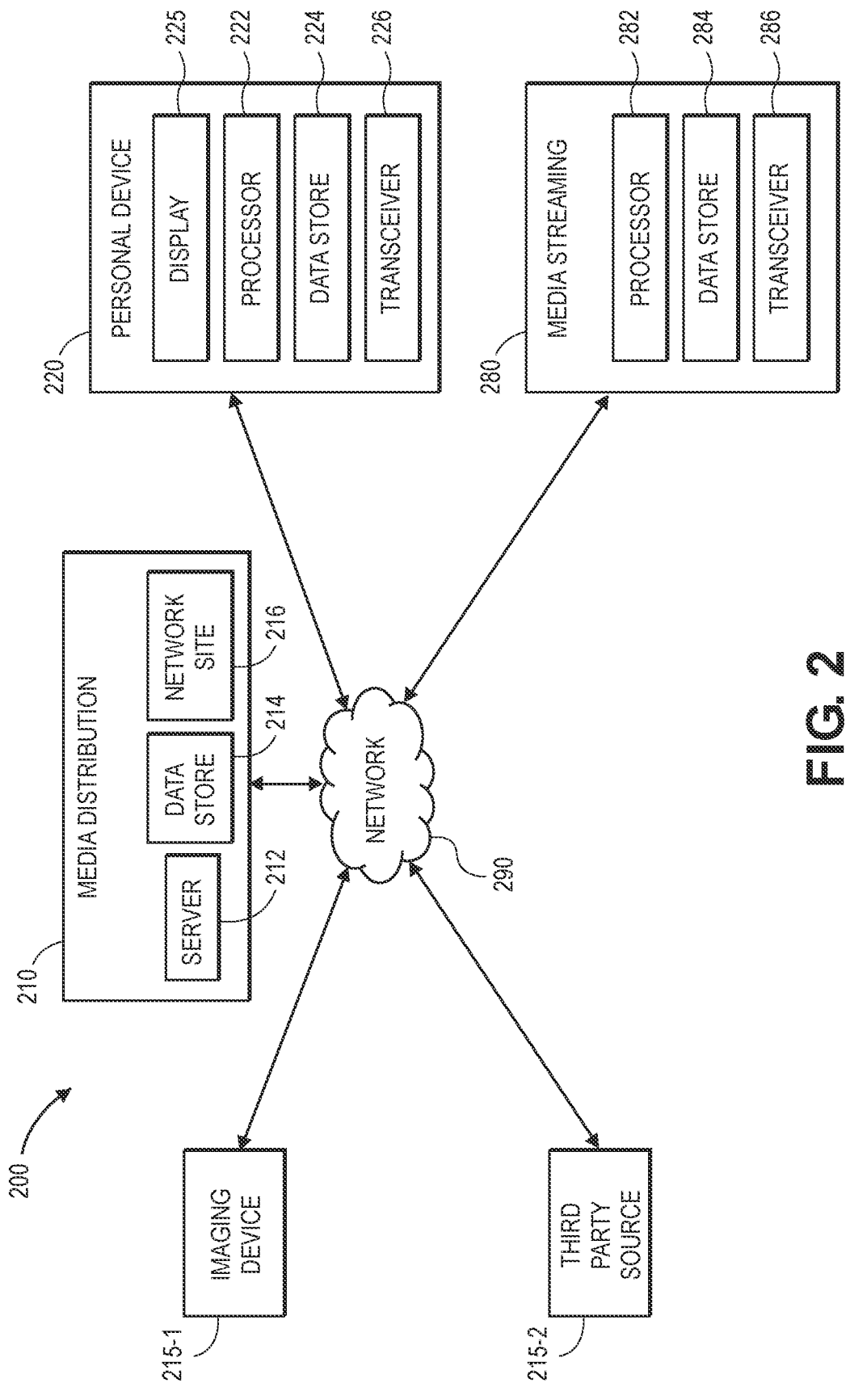
FIG. 2 is a block diagram of components of one system for analyzing streams of media content in accordance with implementations of the present disclosure.

Referring to FIG. 2, a block diagram of components of one system 200 for analyzing streams of media content in accordance with implementations of the present disclosure is shown. Except where otherwise noted, reference numerals preceded by the number "2" shown in FIG. 2 indicate components or features that are similar to components or features having reference numerals preceded by the number "1" shown in FIGS. 1A through 1F.

As is shown in FIG. 2, the system 200 includes a media distribution system 210, one or more imaging devices 215-1 (e.g., cameras), one or more third party sources 215-2 of media, one or more personal devices 220 and one or more media streaming devices 280 that may be connected to one another over one or more networks 290.

The media distribution system 210 may be any device, component or system for receiving and distributing digital media, e.g., still or moving images or other video content, audio content or other multimedia, by way of a networked computer infrastructure including one or more physical computer servers 212 and data stores 214 (e.g., databases) for hosting a network site 216 (or network sites). For example, the media distribution system 210 may be any individual or entity associated with the broadcasting, airing, streaming or distribution of one or more video files received from any number of imaging devices 215-1 or third party sources 215-2 over the networks 290, such as an online marketplace, an entertainment company, a video streaming service, a cable television provider, an operator of an over-the-air television station or channel, a social network, an outlet for news or media of any kind, or any like individual or entity.

The media distribution system 210 may also be provided in connection with one or more physical or virtual services configured to manage or monitor digital media, as well as one or more other functions. The servers 212 may be connected to or otherwise communicate with the data stores 214 and may include one or more processors. The data stores 214 may store any type of information or data, including digital media files or any like files containing multimedia (e.g., audio and/or video content), for any purpose. The servers 212 and/or the data stores 214 may also connect to or otherwise communicate with the networks 290, through the sending and receiving of digital data.

In some implementations, the media distribution system 210 may be an Internet-based streaming content and/or media service provider. For example, the media distribution system 210 may be configured to distribute media (e.g., audio and/or video content) over the network 290 to one or more general purpose computers or computers that are dedicated to a specific purpose. The media distribution system 210 may also be configured to transmit content via a direct broadcast system, or to one or more specifically configured components such as televisions, set-top boxes or like units or components (e.g., cable boxes or converters).

For example, in some implementations, the media distribution system 210 may be associated with a television channel, network or provider of content of any type or form that is configured to transmit video files over the airwaves, via wired cable television systems, by satellite, over the Internet, or in any other manner. In some implementations, the media distribution system 210 may also be associated with any streaming video source that streams one or more video files for free or for a one-time or recurring fees. In some implementations, the media distribution system 210 may be associated with any type or form of network site (e.g., a web site), including but not limited to news sites, sports sites, cultural sites, social networks or other sites, that streams one or more video files over a network. In essence, the media distribution system 210 may be any individual or entity that makes content (e.g., audio and/or video files) of any type or form available to any other individuals or entities over one or more networks 290.

The media distribution system 210 of FIG. 2 may be independently provided for the exclusive purpose of managing the monitoring and distribution of video files or other information or data captured by the imaging device 215-1 or received from the third party source 215-2, such as visual imaging data and/or accompanying audio signals and metadata. Alternatively, the media distribution system 210 may be operated in connection with one or more physical or virtual services configured to manage the monitoring or distribution of such files, as well as one or more other functions. The servers 212 may be connected to or otherwise communicate with the data stores 214 and may include one or more processors, circuits or other like systems or components. The data stores 214 may store any type of information or data, including digital media files or any like files containing multimedia (e.g., audio and/or video content), for any purpose. The network sites 216 may be provided for any purpose in association with the media distribution system 210, including but not limited to the marketing of one or more video files, receiving and granting authentication requests (e.g., log-in names and/or passwords), or any other purpose. The servers 212 and/or the computer processors may also connect to or otherwise communicate with the networks 290, through the sending and receiving of digital data.

The imaging device 215-1 may comprise any form of optical recording sensor or device that may be used to photograph or otherwise record information or data regarding activities occurring within one or more areas or regions of a given environment, e.g., a scene or a setting, or for any other purpose. The media distribution system 210 may be associated with any number of the imaging devices 215-1, each of which may include any number of sensors, memory or storage components (e.g., a database or another data store), processors and any other components that may be required in order to capture, analyze and/or store imaging data or accompanying audio signals captured from within static or variable environments in which an imaging device 215-1 is provided. For example, one or more imaging devices 215-1 may capture one or more still or moving images, along with any relevant audio signals or other information, and may also connect to or otherwise communicate with one another, or with the networks 290.

In addition to the imaging device 215-1, the media distribution system 210 may include any type or form of systems or components for receiving video files and associated audio signals or metadata, e.g., over the networks 290. For example, the media distribution system 210 may receive one or more video files via any wired or wireless means and store such video files in the one or more data stores 214 for subsequent processing, analysis and distribution. In some implementations, the media distribution system 210 may process and/or analyze video files captured by the imaging device 215-1, or received over the networks 290 from one or more external sources according to one or more detection or recognition algorithms or techniques, in order to detect or recognize one or more attributes of the visual content expressed therein, or of the audio signals accompanying such visual content. In some implementations, the media distribution system 210 may be further configured to add or assign metadata, e.g., one or more tags or virtual markings, to video files. Such metadata may indicate times or points within a video file where one or more specific products or categories of products is depicted or referenced therein, or include one or more identifiers of such products or categories. The media distribution system 210 may generate any type or form of record associated with the visual content of a video file, or the audio signals accompanying the video file, and may store such records in association with a corresponding video file or separately, e.g., in a structured form. Such records may be made available to other entities, such as the personal device 220 and/or the media streaming device 280 e.g., over the networks 290.

Additionally, the media distribution system 210 may be further configured to edit, crop, alter, modify or adjust one or more attributes of a video file. For example, where a video file is captured by the imaging device 215-1, or received from the third party source 215-2, e.g., over the networks 290, one or more single images, or streams of images, may be captured or otherwise obtained from the video file, and transmitted to the personal device 220 and/or the media streaming device 280. The media distribution system 210 may also be configured to compare and contrast visual content and/or audio signals or metadata regarding two or more video files, and to make any number of determinations regarding the similarity or differences between such video files, audio signals or metadata. For example, the media distribution system 210 may be configured to identify attributes of one or more video frames of a video file, such as information or data regarding edges, contours, outlines, colors, textures, silhouettes, shapes or other characteristics of objects or portions thereof expressed in such video frames, e.g., according to one or more detection or recognition algorithms or techniques, and to compare such attributes to attributes of other video frames of other video files. The media distribution system 210 may also be configured to calculate one or more scores indicative of similarities or differences between such frames or such files. The media distribution system 210 may also be configured to engage in communications of any type or form with the personal device 220 and/or the media streaming device 280.

The media distribution system 210 may further broadcast, air, stream or otherwise distribute video files maintained in the data stores 214 to one or more users, via the personal devices 220 and/or the media streaming devices 280, over the networks 290. Accordingly, in addition to the server 212, the data stores 214, and the network sites 216, the media distribution system 210 may also include any number of components associated with the broadcasting, airing, streaming or distribution of such files, including but not limited to transmitters, receivers, antennas, cabling, satellites, or communications systems of any type or form. Processes for broadcasting, airing, streaming and distribution of video files over various networks are well known to those skilled in the art of communications and thus, need not be described in more detail herein.

For example, in some implementations, the media distribution system 210 may also receive or access one or more records of information, data or metadata regarding preferences of a given user, or of users similarly situated to the user or otherwise having one or more attributes in common with the user, as well as any information, data or metadata regarding one or more contexts or events, instances or occurrences of particular relevance in association with a specific time or location. Based on such information, data or metadata, the media distribution system 210 may identify media content (e.g., audio and/or video content) to be presented to a user in association with one or more applications or content sources, including but not limited to media content to be promoted to the user, or contextual or supplemental content to be displayed to the user in association with the applications or content sources. The media distribution system 210 may further generate media files including such content, or modify one or more existing media files to include such content, and transfer such video files to the personal device 220 or the media streaming device 280 over the networks 290 or by any other means. Additionally, the media distribution system 210 may further engage in communications of any type or form with the personal devices 220 and/or the media streaming devices 280.

The third party source 215-2 may be any source of media, such as a linear channel, a television station or network, a cable television provider, a streaming service, or others. Media that is received from the third party source 215-2 may have been captured live by one or more cameras or other imaging devices of the third party source 215-2, or otherwise obtained in any other manner, such as by purchasing or renting rights to air the media, e.g., by way of the media distribution system 210 or in any other manner, such as files over the airwaves, via wired cable television systems, by satellite, or in any other manner.

The personal device 220 may be any peripheral output device capable of receiving and displaying or otherwise outputting any content. The personal device 220 may be associated with any user (e.g., an individual or entity), and may be a general purpose or a special purpose device for viewing content and/or communicating with other computer devices over the networks 290. For example, the personal device 220 may be a television of any type or form, as well as any type of networked computer device (e.g., a personal digital assistant, a digital media player, a smartphone, a web pad, an electronic book reader, a desktop computer, a laptop computer or a tablet computer, as well as a wearable computer device such as a pair of augmented reality glasses or a wristwatch, or a computer device that may be incorporated into one or more vehicles or appliances) or any other like machine that may operate or access one or more software applications, or communicate with the media streaming device 280, and may be configured to render content on one or more displays or to interact with such content.

The personal device 220 may include a display (or screen) 225, a processor 222, a data store 224 and/or a transceiver 226. The display 225 may be a television system, a monitor or any other like machine having a screen for viewing rendered video content. For example, the display 225 may incorporate any number of active or passive display technologies or systems, including but not limited to electronic ink, liquid crystal displays (or "LCD"), light-emitting diode (or "LED") or organic light-emitting diode (or "OLED") displays, cathode ray tubes (or "CRT"), plasma displays, electrophoretic displays, image projectors, or other display mechanisms including but not limited to micro-electromechanical systems (or "MEMS"), spatial light modulators, electroluminescent displays, quantum dot displays, liquid crystal on silicon (or "LCOS") displays, cholesteric displays, interferometric displays or others. The display 225 may be configured to receive content from any number of sources via one or more wired or wireless connections, including but not limited to the media distribution system 210 or the media streaming devices 280 over the networks 290.

The processor 222 may be configured to perform any type or form of computing function associated with the operation of the personal device 220, including but not limited to the execution of one or more machine learning tools, algorithms or techniques. The processor 222 may also be configured to execute any other algorithms or techniques (e.g., object detection or recognition algorithms or techniques) associated with one or more applications, purposes or functions, and may communicate with the media distribution system 210, the media streaming system 280, or any other external computing devices or machines over the network, through the sending and receiving of digital data.

The processor 222 may be a uniprocessor system including one processor, or a multiprocessor system including several processors (e.g., two, four, eight, or another suitable number), and may be capable of executing instructions. For example, in some implementations, the processor 222 may be a general-purpose or embedded processor unit such as a CPU or a GPU having any number of instruction set architectures (ISAs), such as the x86, PowerPC, SPARC, or MIPS ISAs, or any other suitable ISA. Where the processor 222 is a multiprocessor system, each of the processors within the multiprocessor system may operate the same ISA, or different ISAs. The processors 222 may be configured to operate one or more software applications, e.g., a browser, a viewing application operating one or more codecs, a shopping application, and render content to the display 225 via one or more user interfaces. The processors 222 may execute one or more computer-based instructions that may be stored on the data store 224, along with one or more video files or operating programs or instructions.

The personal device 220 further includes one or more data stores (e.g., memory or storage components) 224 for storing any type of information or data, e.g., content received over the network 290, or any associated information, data or metadata. The personal device 220 also includes the transceiver 226, which may be configured to enable the personal device 220 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 290 or directly.

The transceiver 226 may be configured to communicate over one or more of the networks 290, such as by receiving and interpreting broadcast signals, cable television signals, computer signals, cellular telephone signals or any other type or form of signals, and responding in kind with any number of corresponding or reciprocal signals. The transceiver 226 may further include or be in communication with one or more input/output (or "I/O") interfaces, network interfaces and/or input/output devices, and may be configured to allow information or data to be exchanged between one or more of the components of the personal device 220, or to one or more other computer devices or systems (e.g., other aerial vehicles, not shown) via the network 290. For example, in some implementations, the transceiver 226 may be configured to coordinate I/O traffic between the processor 222 and one or more external computer devices or components, and may perform any necessary protocol, timing or other data transformations in order to convert data signals from a first format suitable for use by one component into a second format suitable for use by another component. In some implementations, the transceiver 226 may include support for devices attached through various types of peripheral buses, e.g., variants of the Peripheral Component Interconnect (PCI) bus standard or the Universal Serial Bus (USB) standard. In some other implementations, functions of the transceiver 226 may be split into two or more separate components, or integrated with the processor 222.

The media streaming device 280 may also be any type of device or devices capable of outputting visual and/or audible content, e.g., from the media distribution system 210 or any other sources of such content, and providing such content to the personal device 220 according to any protocols and by any wired or wireless techniques, e.g., a high-definition multimedia interface (HDMI) protocol, such as a Consumer Electronics Control (CEC) protocol. The media streaming device 280 includes a processor 282, a data store 284 and a transceiver 286, which may share one or more attributes, features or functions in common with the processor 222, the data store 224 or the transceiver 226, respectively, or may have one or more attributes, features or functions that are different from those of the processor 222, the data store 224 or the transceiver 226. In some implementations, the media streaming device 280 may also be capable of communicating with and controlling the personal device 220, e.g., to turn the personal device 220 on or off, to select an input source for the personal device 220, to adjust a volume of the personal device 220, or to otherwise control any other functions of the personal device 220.

Those of ordinary skill in the pertinent arts will recognize that the personal device 220 or the media streaming device 280 may include any number of hardware components or operate any number of software applications for receiving and rendering content received from the media distribution system 210 or other sources.

Moreover, those of ordinary skill in the pertinent arts will further recognize that, alternatively, in some implementations, the personal device 220 or the media streaming device 280 need not be associated with a given user. For example, the personal device 220 or the media streaming device 280 may be provided in a public place, beyond the control of any one user, e.g., a television provided in a bar, restaurant, transit station, or shopping center, or an electronic billboard provided in a population center or along a transit line, where any individuals may view and/or interact with video content rendered on the display 225.

Although the system 200 shown in FIG. 2 shows boxes for one media distribution system 210, one imaging device 215-1, one third party source 215-2, one personal device 220, one media streaming device 280 and one network 290, those of ordinary skill in the pertinent arts will recognize that any number of media distribution systems 210, imaging devices 215-1, third party sources 215-2, personal devices 220, media streaming devices 280 or networks 290 may be considered in accordance with the present disclosure. For example, multiple users may access, view and interact with content provided by multiple media distribution systems 210 (e.g., television channels or networks, marketplaces, social networks and any other content providers or sites), via multiple personal devices 220, and such content may include multiple types or forms of media provided by multiple content sources. Moreover, the personal devices 220 or the media streaming devices 280 with which users interact to access, view and interact with content may include all or fewer of the components shown in FIG. 2 or perform all or fewer of the functions described herein. For example, a user may view content on one personal device 220, and execute interactions relating to that content on another personal device 220, such as a remote control, a smartphone, a smart speaker, a smart wristwatch, or the like.

The network 290 may be any wired network, wireless network, or combination thereof, and may comprise the Internet, intranets, broadcast networks, cellular television networks, cellular telephone networks, satellite networks, or any other networks, in whole or in part. In addition, the network 290 may be a personal area network, local area network, wide area network, cable network, satellite network, cellular telephone network, or combination thereof, in whole or in part. The network 290 may also be a publicly accessible network of linked networks, possibly operated by various distinct parties, such as the Internet. In some implementations, video files may be provided by the media distribution system 210 to the personal device 220 or the media streaming device 280 over multiple networks. For example, a video file may be broadcast over the air or via satellite to a cable television provider, before being transmitted by the satellite or the provider to a receiver associated with the personal device 220, and shown on the display 225 and/or recorded in the data store 224. Alternatively, video files may be transmitted over a traditional computer network, such as the Internet, prior to reaching the personal device 220. In some implementations, the network 290 may include a private or semi-private network, such as a corporate or university intranet. The network 290 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The server 212 and the personal device 220, and associated components, may use any web-enabled or Internet applications or features, or any other client-server applications or features, to connect to the networks 290, or to communicate with one another, such as through short or multimedia messaging service (SMS or MMS) text messages. For example, the server 212, the personal device 220 and the media streaming device 280 may be configured to transmit information or data in the form of synchronous or asynchronous messages to one another in real time or in near-real time, or in one or more offline processes, via the networks 290. Those of ordinary skill in the pertinent art would recognize that the server 212, the personal device 220 and the media streaming device 280 may include or operate any of a number of computing devices that are capable of communicating over the networks 290. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the server 212, the processor 222, or the processor 282, or to any other computers or control systems utilized by the media distribution system 210, the personal device 220, or the media streaming device 280, and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks, e.g., the network 290.

As used herein, the terms "image," "video," "video program," or like terms, may refer to files comprising one or more images or video frames that are configured for broadcasting, airing, streaming or distributing in any manner, such as over any number of networks, or in a hard storage format (e.g., a DVD, a stick drive or another physically portable format). As used herein, the terms "sounds," "audio," "audio program," or like terms, may refer to files comprising one or more sounds or other acoustic signals that are also configured for broadcasting, airing, streaming or distributing in any manner, such as over any number of networks, or in a hard storage format. As used herein, the terms "program," "content" or "media" may refer to audio and/or video files that may be presented by one or more of a personal device directly, or by a personal device via a media streaming device, and may include but are not limited to information, data or metadata including or relating to such audio and/or video files.

Figure 3:
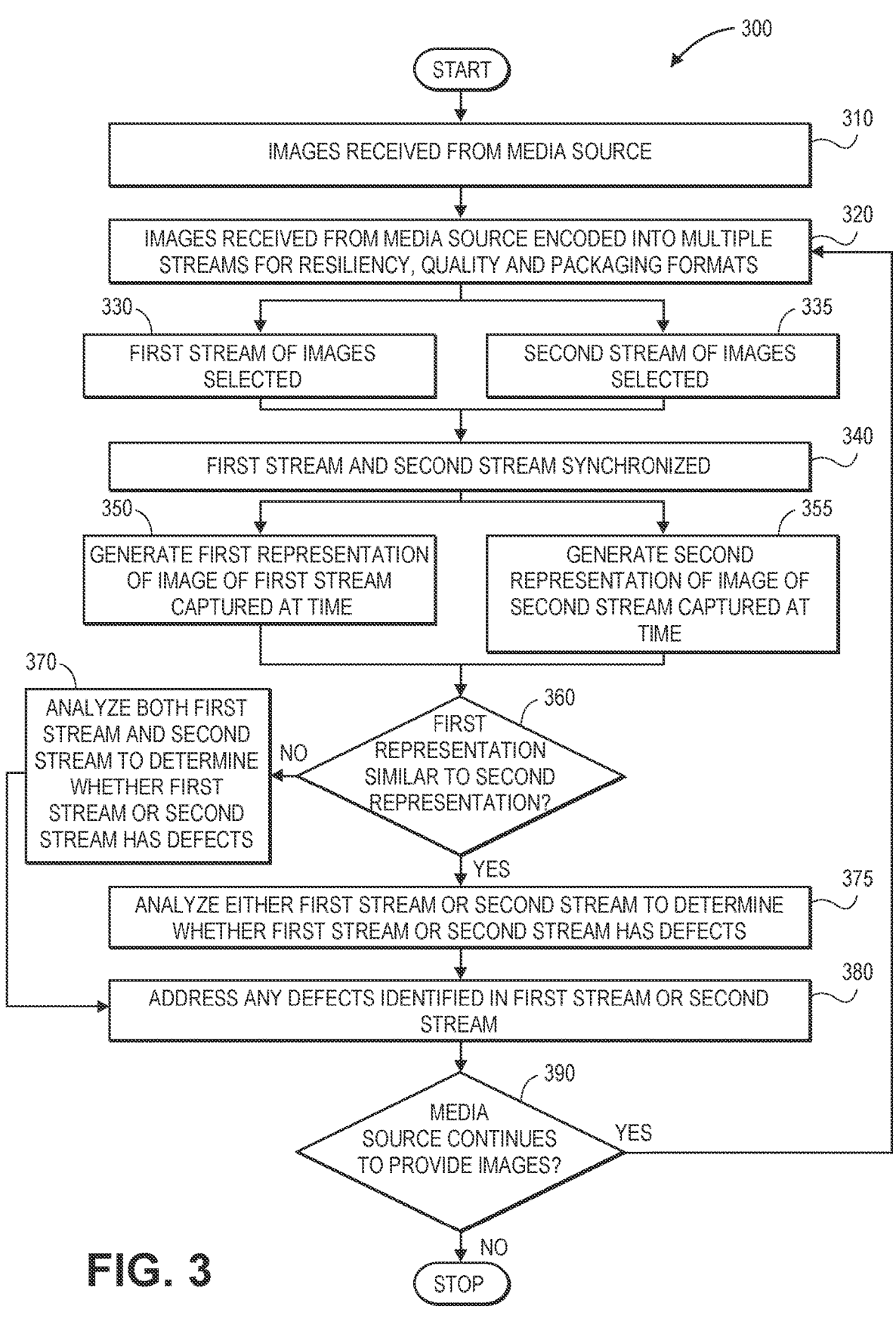
FIG. 3 is a flow chart of one process for analyzing streams of media content in accordance with implementations of the present disclosure.

Referring to FIG. 3, a flow chart 300 of one process for presenting options for analyzing streams of media content in accordance with implementations of the present disclosure is shown. At box 310, images are received from a media source. The media source may include one or more cameras or other image capture devices or systems, which may be provided in fixed or mobile configurations, and may be configured to capture audio signals or any other information or data along with the images. Alternatively, the media source may be associated with any other third party, such as a linear channel, a television station or network, a cable television provider, a streaming service. Media may be received from the media source over the airwaves, via wired cable television systems, by satellite, or in any other manner.

The media source may be associated with an event or a location of interest. For example, the event may be any type of event that may occur in any location. In some implementations, the event may involve actions by one or more human actors, animals or machines, or any other natural or man-made occurrences, of which images may be captured and utilized for news, sports, entertainment or other purposes. The location of interest may be a traditional studio, theater, stadium or other venue from which video or audio signals are commonly captured for news, sports, entertainment or other purposes, or any other location, facility, structure or space. Alternatively, the location of interest may be any ground-based, airborne or sea-based location where an event occurs, e.g., on schedule or spontaneously. The event or the location may include any type or form of computer processor-driven equipment, as well as any number of cameras, microphones, monitors, lighting facilities, speakers, routers, servers, mixers, patch panels or other components.

At box 320, images received from the media source are encoded into multiple streams for resilience, quality or packaging formats. For example, in some implementations, the images may be processed to prepare such images and any accompanying audio signals, information, data or metadata for presentation via one or more displays, speakers or other systems. In some implementations, the images may be encoded into multiple streams for redundancy. In some other implementations, the images may be encoded into multiple streams for quality, e.g., levels of resolution such as standard definition ("SD"), high definition ("HD"), ultra-high definition ("UHD"), or others, which may be provided at any pixel density or aspect ratio. In some other implementations, encoded images may be packaged into any number of streams, with each of such streams corresponding to one or more packaging formats, e.g., for specific devices or applications, such as HTTP Live Streaming (or "HLS"), Dynamic Adaptive Streaming over HTTP (or "DASH"), or any other formats for use by devices or applications. The number of streams into which the images from the media source may be encoded is not limited.

At box 330, a first stream of images from the media source is selected. In parallel, at box 335, a second stream of images from the media source is selected. The first stream and the second stream may be selected at random or on any other basis. In some implementations, any number of the streams encoded at box 320 may be selected. In some other implementations, the first stream or the second stream may be selected as having a specific level of resolution, pixel density or aspect ratio. In some other implementations, all of such streams may be selected.

At box 340, the first stream of images and the second stream of images are synchronized. The first stream and the second stream of images may be provided to a synchronizer, or a synchronizer module, to determine any offsets between images of the first stream and images of the second stream, or otherwise synchronized in any manner. In some implementations, the first stream and the second stream may be compared with one another on an image frame-by-image frame basis. For example, in some implementations, a peak signal-to-noise ratio (or "SNR") may be determined between individual images of each of such streams, or combinations of images of each of such streams (e.g., ranges of contiguous frames), for which an average peak signal-to-noise ratio may be calculated for each of such combinations. The peak signal-to-noise ratio may be calculated based on a mean squared error over all color components of any pair of the images. Windows or ranges of images of each of such streams may be aligned or otherwise synchronized based on the average peak signal-to-noise ratios calculated for pairs of images of such streams.

In some implementations, images may be synchronized according to a structural similarity index measure, e.g., a perceptron-based model that may predict a level of quality of an image based on a perceived change in structural information regarding the image. For example, distortion of image components such as luminance, contrast and structure may be compared to one another to determine a level of quality of an image, e.g., by a weighted comparison. Windows or ranges of images of each of such streams may be aligned or otherwise synchronized based on the structural similarity of such images or streams. Alternatively, in some implementations, all of the streams of images from the media source may be synchronized.

In some implementations, images may be synchronized using hashes or other representations generated from such images. For example, representations of a window or range of images of the first stream may be generated and compared to representations of a window or range of images of the second stream. Where a representation of an image of the first stream, or an average of the representations of images of the first stream, are nearest in value to a representation of an image of the second stream, or an average of the representations of images of the second stream, content of the image of the first stream may be determined to be similar to content of the images of the second stream, and the first stream and the second stream may be synchronized with respect to the respective images.

Representations of images may be generated according to any algorithm, system or technique. For example, in some implementations, the representations of the images may be hashes calculated according to a hashing algorithm, such as an average hash, a block hash, a difference hash, a perceptual hash or a wavelet hash. A hashing algorithm (or a hash function) may generate a hash value for an image by converting the image to a grayscale format or model and reducing a level of resolution of the image before determining values corresponding to each of such pixels. In some implementations, images at various levels of resolution may be scaled down to a common size and low level of resolution, and a hashing algorithm may calculate values corresponding to each pixel according to any formula, such as by computing differences between adjacent pixels and assigning a value (e.g., a bit) representing the difference to one of the pixels. The hashing algorithm may generate a hash value comprising each of such values. For example, in some implementations, a difference hash may be calculated by reducing a size of an image to (m×n) pixels, and converting the image to grayscale, then calculating differences between adjacent pixels, such that for each pixel (i, j) of the (m×n) pixels, a value representing a difference between the pixel (i, j) and an adjacent pixel, or one of the pixel (i−1, j), the pixel (i+1, j), the pixel (i, j−1) or the pixel (i, j+1), may be calculated. The difference hash may be formed from a string of values representing such differences for each pixel.

At box 350, a first representation of a first image of the first stream captured at a time is generated. The first representation of the first image may be generated according to any algorithm, system or technique. For example, in some implementations, a hash or another representation may be calculated for each image according to a hashing algorithm, such as an average hash, a block hash, a difference hash, a perceptual hash or a wavelet hash. A hashing algorithm may generate a hash value for an image by converting the image to a grayscale format or model and reducing a level of resolution of the image before determining values corresponding to each of such pixels. In some implementations, images at various levels of resolution may be scaled down to a common size and low level of resolution, and a hash function may calculate values corresponding to each pixel according to any formula, such as by computing differences between adjacent pixels and assigning a value (e.g., a bit) representing the difference to one of the pixels.

Alternatively, the first representation of the first image may be formed in any other manner and on any other basis. For example, in some implementations, the representation may relate to any attribute of the first image, e.g., a luminance, a contrast or a structure of the first image.

In parallel, at box 355, a second representation of a second image of the second stream captured at the time is generated. The second representation of the second image is created in the same manner or according to the same algorithm, system or technique as the first representation of the first image at box 350.

At box 360, whether the first representation is similar to the second representation is determined. For example, where both the first representation and the second representation are hashes, a hamming distance, or a number of bits that are different between a pair of hashes, may be calculated. Where the first image and the second image are derived from a common image but have different levels of resolution, and both of the images are reduced in size and resolution, the first image and the second image should have common or similar hashes if the first stream and the second stream are not subject to any defects. If the hamming distance between a pair of images is sufficiently small, e.g., below a predetermined threshold, such that both the first representation and the second representation are sufficiently near one another, the first image may be deemed to be similar to the second image. If the hamming distance between the pair of images is sufficiently large, e.g., above a predetermined threshold, the first image may be deemed to be not similar to the second image.

Where both the first representation and the second representation relate to attributes of the first image and the second image, respectively, a comparison of the first image to the second image may be a signal-to-noise ratio, a structural similarity measure, or any other metric relating to the respective attributes.

If the first representation is determined to be not similar to the second representation, however, then the process advances to box 370, where both the first stream and the second stream must be analyzed to determine whether the first stream or the second stream contains any defects. For example, where the first representation and the second representation are not sufficiently similar to one another, images of both the first stream and the second stream cannot be considered together in determining a status or a condition of both of the streams, viz., whether each of such streams is free of defects.

If the first representation is determined to be similar to the second representation, however, then the process advances to box 375, where either the first stream or the second stream may be analyzed to determine a status or a condition of both of the streams, viz., whether the first stream and the second stream have any defects.

At box 380, any defects identified in the first stream or the second stream are addressed. For example, any number of investigative or evaluative actions may be performed on the first stream or the second stream to identify and resolve an identified defect. In some implementations, an encoder that processes images received from the media source into images in any of a plurality of profiles may be restarted, rebooted or otherwise repaired, as necessary. Similarly, a packager that packages a stream of images along with audio signals or other information, data or metadata may be restarted, rebooted or otherwise repaired, as necessary.

In some other implementations, where a defect in a stream involves a missing frame, presence of an artifact within an image frame, or audio deficiencies, the video stream may be repaired, resynchronized or otherwise modified to address the defect. In some other implementations, software applications or hardware configurations may be evaluated to determine whether a defect in a stream was caused by a network connectivity issue, a lack of available power, or any other cause that may be remedied in any manner.

At box 390, whether the media source continues to provide images is determined. If the media source continues to provide images, the process returns to box 320, where images received from the media source are encoded into multiple streams for resilience, quality or packaging formats. If the media source no longer continues to provide images, however, then the process ends.

Although the process represented in the flow chart 300 of FIG. 3 includes a comparison of only two streams, viz., a first stream and a second stream, those of ordinary skill in the pertinent arts will understand that any number of streams may be synchronized and compared to one another to determine whether or how many of such streams are similar to one another. Where a group of any number of streams is identified as similar in accordance with implementations of the present disclosure, only a single stream of the group need be analyzed to determine whether that stream is experiencing any defects or is defect-free, and a determination as to a status of the single stream of the group may be applied to all of the streams in the group. Any number of groups of streams may be identified as similar to one another and may include any number of streams.

Figure 4:
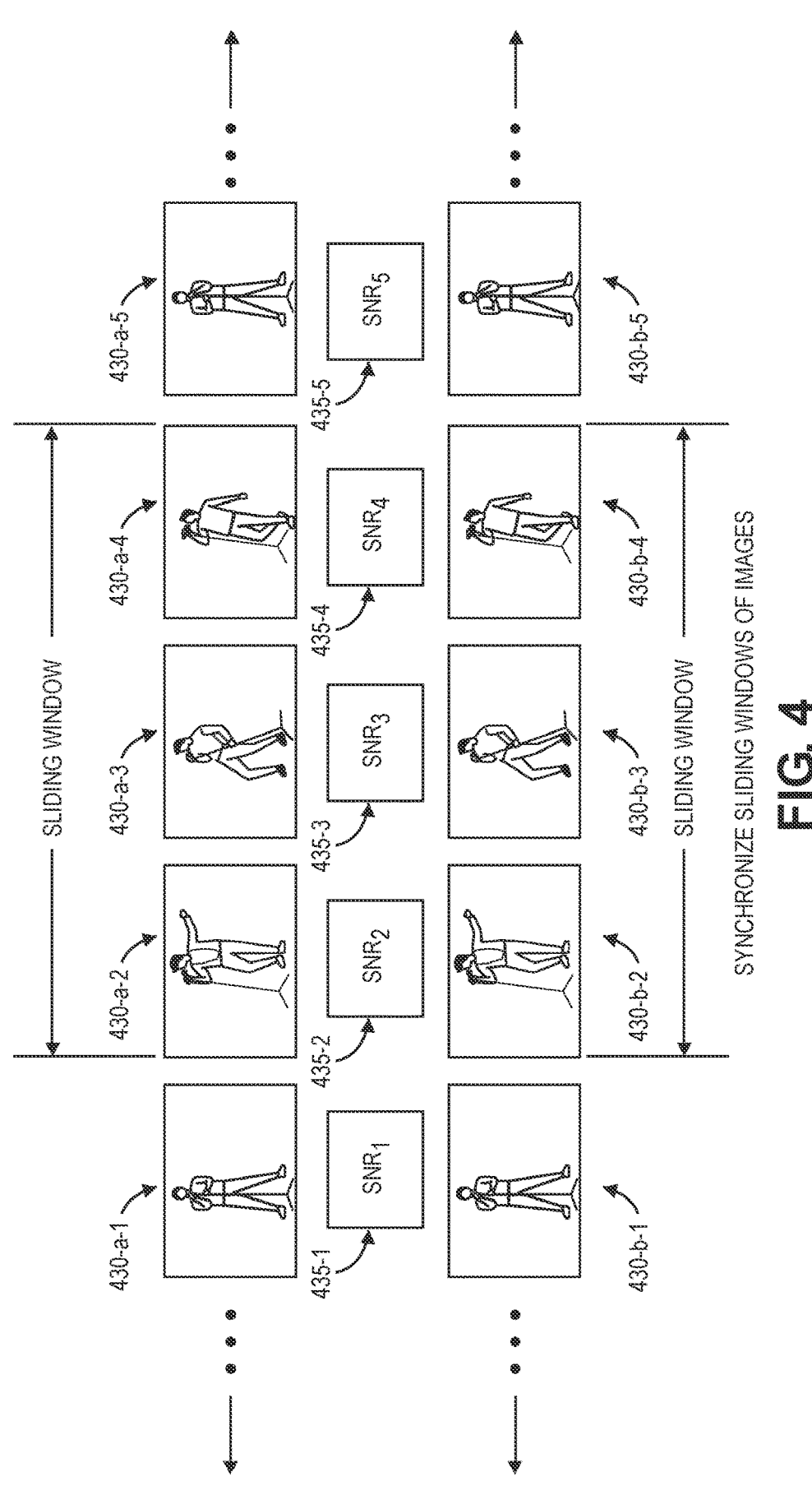
FIG. 4 is a diagram of aspects of one system for analyzing streams of media content in accordance with implementations of the present disclosure.

Referring to FIG. 4, views of aspects of one system for analyzing streams of media content in accordance with implementations of the present disclosure are shown. Except where otherwise noted, reference numerals preceded by the number "4" shown in FIG. 4 indicate components or features that are similar to components or features having reference numerals preceded by the number "2" shown in FIG. 2 or by the number "1" shown in FIGS. 1A through IF.

As is shown in FIG. 4, a plurality of signal-to-noise ratios 435-1, 435-2, 435-3, 435-4, 435-5, or $SNR_1$, $SNR_2$, $SNR_3$, $SNR_4$, $SNR_5$, are calculated based on a subset of images **430-*a*-1, 430-*a*-2, 430-*a*-3, 430-*a*-4, 430-*a*-5 of one video stream and a subset of images 430-*b*-1, 430-*b*-2, 430-*b*-3, 430-*b*-4, 430-*b*-5 of another video stream. In some implementations, noise present within one image of one of the subsets may be determined in comparison to each of the images in another of the subsets, e.g., according to a mean squared error function, or in any other manner, and a peak signal-to-noise ratio may be determined as a maximum value of one of the pixels to the noise present in the image. Alternatively, as is shown in FIG. 4, signal-to-noise ratios calculated for ranges or windows of the images 430-*a*-2, 430-*a*-3, 430-*a*-4 and the images 430-*b*-2, 430-*b*-3, 430-*b*-4 may be determined and compared to one another, and the windows or ranges may be slid or otherwise translated or adjusted with respect to one another in order to synchronize the windows or ranges of images with respect to a peak signal-to-noise ratio of one pair of the images, viz., the signal-to-noise ratios 435-2, 435-3, 435-4**, or $SNR_2$, $SNR_3$, $SNR_4$, or a peak average signal-to-noise ratio of the windows or ranges of images.

Any pair of images for which a signal-to-noise ratio is at a peak, or any windows or ranges of images for which an average signal-to-noise ratio is at a peak, may be deemed to be aligned in time and analyzed together to determine whether such images, or the subsets in which such images were included, may be deemed synchronized or aligned in time. Where the streams of images are generated at a common frame rate or frequency, other images of the respective subsets may be aligned with respect to the pair of images for which the signal-to-noise ratio is at a peak.

Alternatively, images of video streams may be synchronized in any other manner. For example, in some implementations, images may be synchronized according to a structural similarity index measure, e.g., a perceptron-based model that may predict a level of quality of an image based on a perceived change in structural information regarding the image. For example, distortion of image components such as luminance, contrast and structure may be compared to one another to determine a level of quality of an image, e.g., by a weighted comparison. In still other implementations, images of video streams may be aligned where hashes or other representations of the images are calculated or otherwise determined. For example, where a hash generated for one of the images of one stream is within a minimum distance or threshold (e.g., a minimum hashing distance) of a hash generated for another image of another stream, the respective images of the respective streams may be determined to be synchronized with respect to one another.

Figure 5:
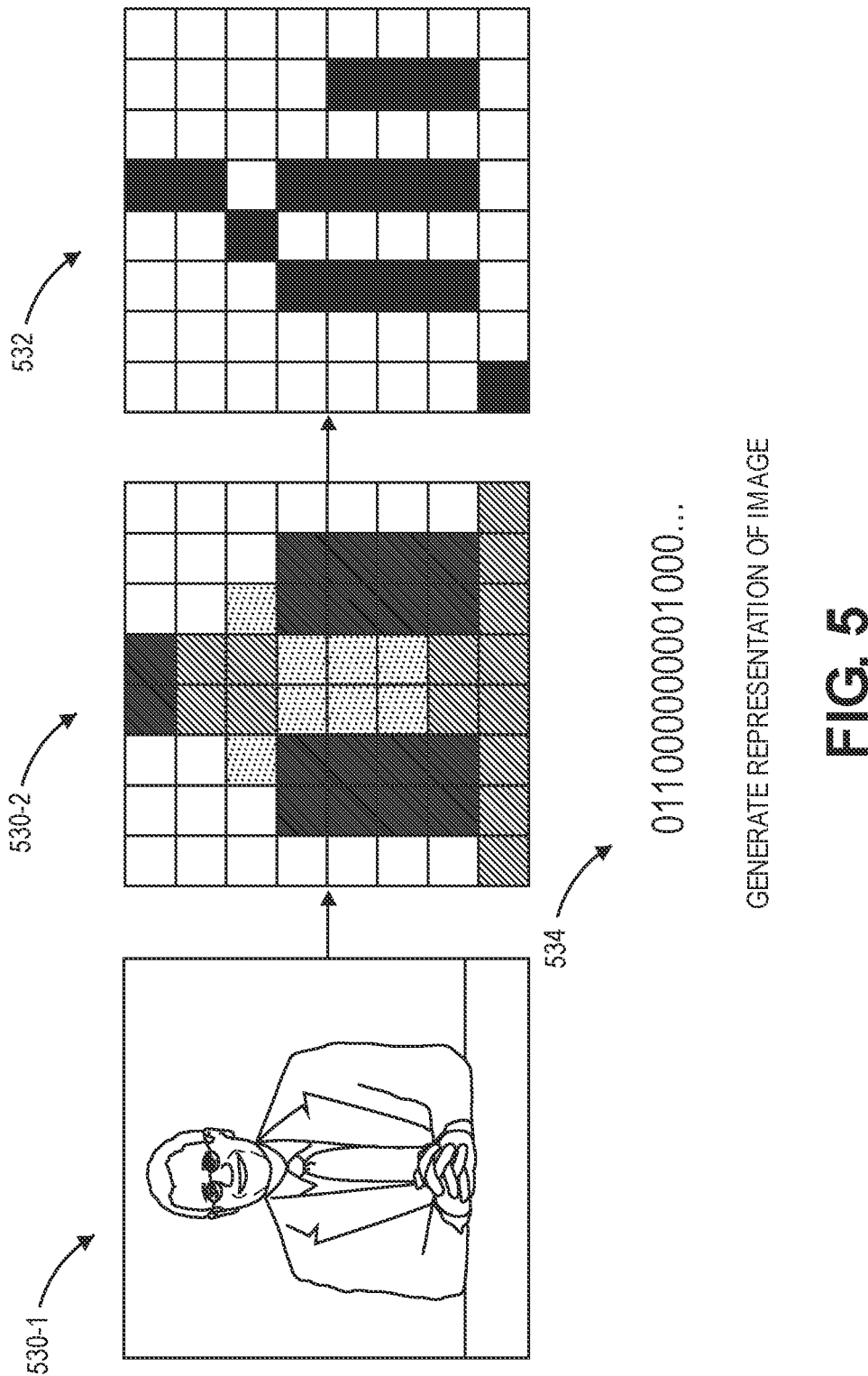
FIG. 5 is a diagram of aspects of one system for analyzing streams of media content in accordance with implementations of the present disclosure.

Referring to FIG. 5, views of aspects of one system for analyzing streams of media content in accordance with implementations of the present disclosure are shown. Except where otherwise noted, reference numerals preceded by the number "5" shown in FIG. 5 indicate components or features that are similar to components or features having reference numerals preceded by the number "4" shown in FIG. 4, by the number "2" shown in FIG. 2 or by the number "1" shown in FIGS. 1A through 1F.

As is shown in FIG. 5, one image 530-1 of a stream of images derived from an image captured by a media source at an event or location of interest is shown. The stream of images including the image 530-1 may have been captured at any level of quality or resolution, and any frame rate, by a camera or another imaging device along with any audio signals, information, data or metadata.

In accordance with implementations of the present disclosure, a representation of the image 530-1 may be generated by generating an image 530-2 that is converted to grayscale and has a reduced size and level of resolution compared to the image 530-1. For example, in some implementations, the image 530-2 may be a sufficiently small image, such as an eight pixel by eight pixel image. The image 530-2 may then be processed to generate a comparison image 532. Once the comparison image 532 has been generated, a hash 534, e.g., an average hash, a difference hash, a perceptual hash, a wavelet hash, or any other hash, may be generated based on values of the respective pixels of the comparison image 532 according to any algorithms, systems or techniques.

The hash 534 may be compared to hashes generated based on comparison images that are generated from images of other video streams that are generated from images that are aligned in time with the image 530-1 in the same manner as the hash 534, and reduced to the same size and level of resolution as the image 530-2. The hash 534 may include a series of binary digits, each corresponding to values of the respective pixels of the comparison images. Where a hamming distance between the hash 534 and another similarly generated hash is below a predetermined threshold, the stream of images including the image 530-1 and a stream of images including an image from which the other similarly generated hash are derived may be determined to be similar to one another. A determination as to whether one of the streams of images includes one or more defects, or is defect-free, may be applied to all streams of images that are similar to that stream.

In some implementations, streams may be synchronized and also analyzed for similarity according to common algorithms, systems or techniques, subject to different standards or thresholds, as necessary. For example, where signal-to-noise ratios are calculated between images of streams, an image of one stream may be deemed synchronized with an image of another stream where a signal-to-noise ratio between the images exceeds a first threshold, and may be deemed similar to one another where the signal-to-noise ratio exceeds a second threshold that is greater than the first threshold. Where structural similarity measures are calculated between images of streams, an image of one stream may be deemed synchronized with an image of another stream where a structural similarity measure calculated for the images exceeds a first threshold, and may be deemed similar to one another where the structural similarity measure exceeds a second threshold that is greater than the first threshold. Where hashes or other representations are calculated for images of streams, an image of one stream may be deemed synchronized with an image of another stream where a hamming distance calculated based on hashes or other representations of the images is below a first threshold, and may be deemed similar to one another where the hamming distance is below a second threshold that is less than the first threshold.

Figure 6:
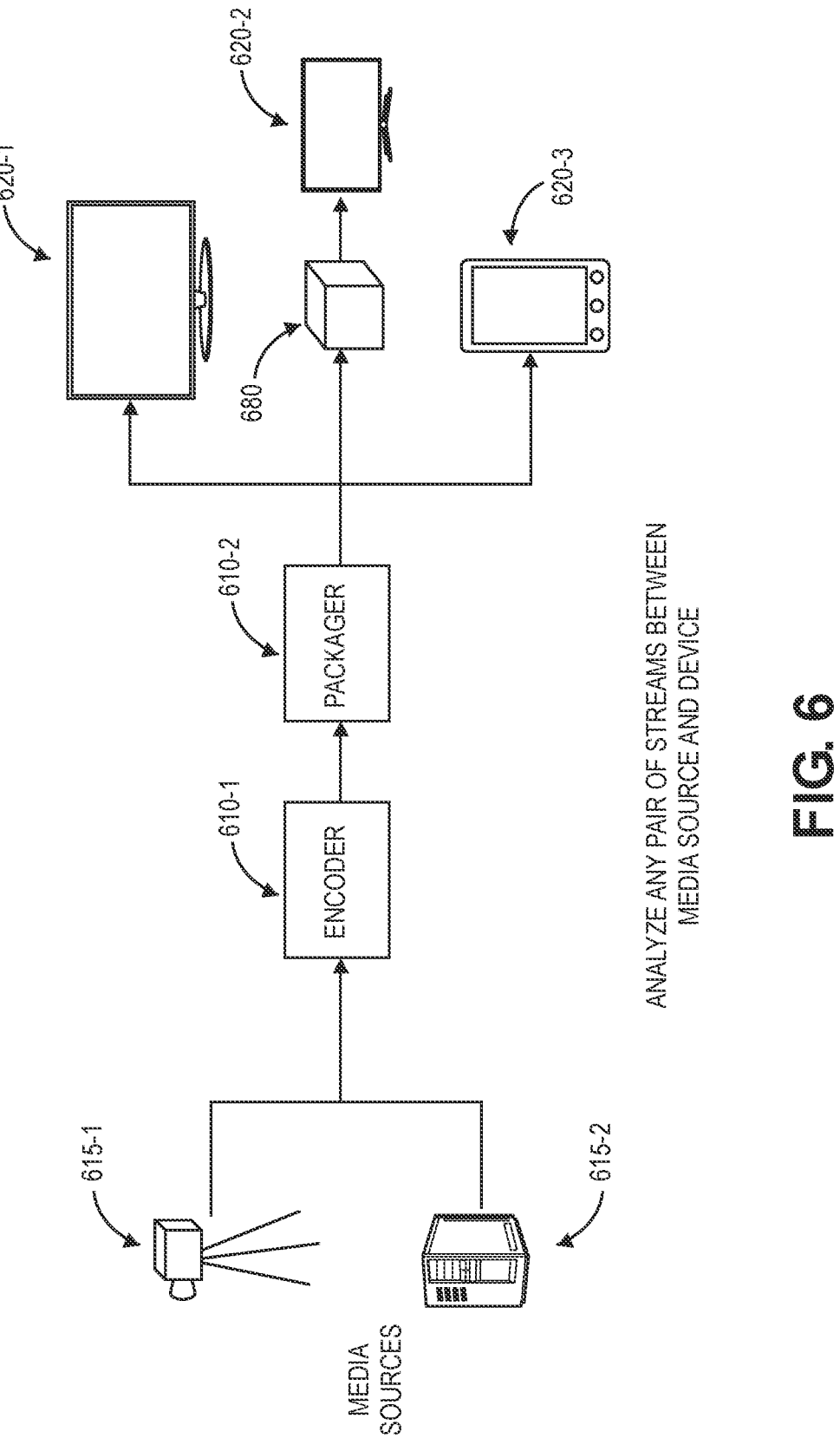
FIG. 6 is a diagram of aspects of one system for analyzing streams of media content in accordance with implementations of the present disclosure.

The systems and methods of the present disclosure may also be used to evaluate integrity of a streaming process by evaluating streams at various points in a chain of signals for similarity. Referring to FIG. 6, views of aspects of one system for analyzing streams of media content in accordance with implementations of the present disclosure are shown. Except where otherwise noted, reference numerals preceded by the number "6" shown in FIG. 6 indicate components or features that are similar to components or features having reference numerals preceded by the number "5" shown in FIG. 5, by the number "4" shown in FIG. 4, by the number "2" shown in FIG. 2 or by the number "1" shown in FIGS. 1A through 1F.

As is shown in FIG. 6, media received from one or more cameras 615-1 or a third party source 615-2 may be provided to one or more encoders 610-1 to generate streams in accordance with any number of profiles, and to one or more packagers 610-2 to package the streams along with audio signals, information, data or metadata for transmission to users of various devices or systems, such as a television 620-1 configured to play such streams directly, to a streaming device 680 for subsequent conversion and streaming to a television 620-2 indirectly, and a mobile device 620-3. Alternatively, media may be received from any number of media sources, e.g., any number of cameras, third party sources or other systems, and encoded and packaged by any number of encoders 610-1 or packagers 610-2 for playing by any number of devices 620-1, 620-2, 620-3, either directly of by way of any number of streaming devices 680.

In accordance with implementations of the present disclosure, any of the streams into and out of the encoder 610-1 or the packager 610-2 may be synchronized and processed to determine whether such streams are similar to one another. Where such streams are deemed similar, the operation of the encoder 610-1 or the packager 610-2 may be determined to operating satisfactorily. Where streams into and out of the encoder 610-1 or the packager 610-2 are not synchronized or are deemed to be not similar to one another, the encoder 610-1 or the packager 610-2 may be determined to be potentially faulted, and further inspection or evaluation may be performed on the encoder 610-1 or the packager 610-2.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

For example, although some of the implementations described herein or shown in the accompanying figures refer to the display of television programs, movies, sporting events, news or music programming on televisions or monitors, the systems and methods disclosed herein are not so limited, and content may be presented on any type or form of personal device, including but not limited to computers, telephones or any other devices having one or more displays and, optionally, audio speakers.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIG. 3, orders in which such methods or processes are presented are not intended to be construed as any limitation on the claimed inventions, and any number of the method or process steps or boxes described herein can be combined in any order and/or in parallel to implement the methods or processes described herein.

Additionally, it should be appreciated that the detailed description is set forth with reference to the accompanying drawings, which are not drawn to scale. In the drawings, the use of the same or similar reference numbers in different figures indicates the same or similar items or features. Except where otherwise noted, one or two left-most digit(s) of a reference number identify a figure or figures in which the reference number first appears, while two right-most digits of a reference number in a figure indicate a component or a feature that is similar to components or features having reference numbers with the same two right-most digits in other figures.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two.

A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A media distribution system in communication with at least one camera, wherein the media distribution system comprises:

at least one computer processor;

a data store; and a transceiver, wherein the data store has instructions stored thereon that, when executed by the at least one computer processor, cause the media distribution system to perform a method comprising:

receiving a plurality of images captured by the at least one camera;

generating a first stream of images from the plurality of images in accordance with a first profile, wherein the first profile is associated with a first level of resolution;

generating a second stream of images from the plurality of images in accordance with a second profile, wherein the second profile is associated with a second level of resolution;

packaging the first stream of images with a plurality of sounds;

packaging the second stream of images with the plurality of sounds;

transmitting at least the first stream of images packaged with the plurality of sounds to at least a first device over one or more networks;

transmitting at least the second stream of images packaged with the plurality of sounds to at least a second device over the one or more networks;

calculating a first hash from a first image of the first stream of images;

calculating a second hash from a second image of the second stream of images;

determining that the first hash is within a threshold distance of the second hash;

in response to determining that the first hash is within the threshold distance of the second hash, allocating at least the first stream of images and the second stream of images to a common group of streams of images;

determining, by the at least one computer processor, that the first stream of images is free of defects, wherein determining that the first stream of images is free of defects comprises at least one of:

determining that the first stream of images is not experiencing a loss of video;

determining that the first stream of images is not experiencing block corruption;

determining that the first stream of images is not experiencing a frozen video stream; and determining that the first stream of images does not include any artifacts; and in response to determining that the first stream of images is free of defects, storing an indication that each one of the streams of images of the common group is free of defects.

2. The media distribution system of claim 1, wherein the method further comprises:

calculating signal-to-noise ratios between the first image and at least some of the second stream of images, wherein the second image is one of the at least some of the second stream of images;

determining that a peak signal-to-noise ratio of the signal-to-noise ratios is between the first image and the second image; and in response to determining that the peak signal-to-noise ratio of the signal-to-noise ratios is between the first image and the second image, adjusting at least one of the first stream of images or the second stream of images to correspond in time.

3. The media distribution system of claim 1, wherein the first level of resolution is greater than the second level of resolution, wherein generating the first stream of images comprises:

formatting the first stream of images for playing by a first application executed by at least the first device, and wherein generating the second stream of images comprises:

formatting the second stream of images for playing by a second application executed by at least the second device.

4. The media distribution system of claim 1, wherein the at least one camera captured the plurality of images live at one of:

a news broadcast;

a sporting event; or a television show.

5. A computer-implemented method comprising:

generating a first stream of media comprising a first plurality of images generated by at least one encoder, wherein each one of the first plurality of images is generated in accordance with a first profile at least in part from images obtained from a media source;

generating a second stream of media comprising a second plurality of images generated by the at least one encoder, wherein each one of the second plurality of images is generated in accordance with a second profile at least in part from the images obtained from the media source;

calculating a peak signal-to-noise ratio between at least one image of a first subset of the first plurality of images and at least one image of a second subset of the second plurality of images;

determining that at least the first subset corresponds in time to at least the second subset;

processing at least a first image of the first subset and at least a second image of the second subset to generate a first determination as to similarity of the first subset and the second subset;

processing the first subset to generate a second determination as to a condition of at least the first subset; and storing an indication of the condition of at least the first subset based at least in part on the first determination and the second determination in at least one data store, wherein the indication identifies the condition of the first subset if the first determination is that the first subset is not similar to the second subset, and wherein the indication identifies the condition of at least the first subset and the second subset if the first determination is that the first subset is similar to the second subset.

6. The computer-implemented method of claim 5, wherein determining that the first subset corresponds in time to the second subset comprises:

calculating a peak signal-to-noise ratio between one image of the first subset and one image of the second subset of images, wherein that the first subset of images of the first stream corresponds in time to the second subset of images of the second stream is determined based at least in part on the peak signal-to-noise ratio.

7. The computer-implemented method of claim 5, wherein determining that the first subset corresponds in time to the second subset comprises:

calculating a first hash value of one image of the first subset;

calculating a second hash value of one image of the second subset; and determining that the first hash value is within a threshold distance of the second hash value.

8. The computer-implemented method of claim 5, wherein determining that the first subset corresponds in time to the second subset comprises:

calculating a structural similarity measure of one image of the first subset to one image of the second subset based at least in part on a comparison of at least one of a luminance, a contrast or a structure of the one image of the first subset to at least one of a luminance, a contrast or a structure of the one image of the second subset; and determining that the structural similarity measure of the one image of the first subset to the one image of the second subset exceeds a predetermined threshold.

9. The computer-implemented method of claim 5, wherein processing at least the first image of the first subset and at least the second image of the second subset to generate the first determination comprises:

calculating a first hash value of at least the first image; and calculating a second hash value of at least the second image, wherein the first determination is that the first subset is similar to the second subset if the first hash value is within a threshold distance of the second hash value, and wherein the first determination is that the first subset is not similar to the second subset if the first hash value is greater than the threshold distance of the second hash value.

10. The computer-implemented method of claim 5, wherein processing at least the first image of the first subset and at least the second image of the second subset to generate the first determination comprises:

calculating a peak signal-to-noise ratio based at least in part on the first image and the second image, wherein the first determination is that the first subset is similar to the second subset if the peak signal-to-noise ratio is less than a threshold value, and wherein the first determination is that the first subset is not similar to the second subset if the peak signal-to-noise ratio is greater than the threshold value.

11. The computer-implemented method of claim 5, wherein generating the first stream of media comprising the first plurality of images comprises:

encoding, by a first encoder, the images obtained from the media source into the first plurality of images, and wherein generating the second stream of media comprising the second plurality of images comprises:

encoding, by a second encoder, the images obtained from the media source into the second plurality of images.

12. The computer-implemented method of claim 5, wherein the first plurality of images has a first level of resolution in accordance with the first profile, wherein the second plurality of images has a second level of resolution in accordance with the second profile, and wherein the first level of resolution is different from the second level of resolution.

13. The computer-implemented method of claim 5, wherein the first stream of media is formatted for playing by one of a first device or a first application in accordance with the first profile, and wherein the second stream of media is formatted for playing by one of a second device or a second application in accordance with the second profile.

14. The computer-implemented method of claim 5, wherein the media source is a source of at least one of a television program or a movie, and wherein each one of the images obtained from the media source is one image of the television program or the movie.

15. The computer-implemented method of claim 5, wherein the media source is at least one camera, and wherein the computer-implemented method further comprises:

receiving, by a system comprising the at least one encoder, the images from the at least one camera, wherein each one of the images is captured live at an event by the at least one camera, and wherein the event is one of:

a news broadcast;

a sporting event; or a television show.

16. A computer-implemented method comprising:

receiving images from at least one media source;

generating a plurality of streams based at least in part on the images received from the at least one media source;

identifying, for each one of the plurality of streams, an image captured at a common time;

determining that a plurality of the images captured at the common time are similar to one another; and in response to determining that the plurality of the images captured at the common time are similar to one another, identifying a subset of the plurality of streams, wherein each of the streams of the subset includes one of the plurality of images captured at the common time that are similar to one another;

selecting one of the plurality of streams of the subset;

determining that the selected one of the plurality of streams of the subset is free of defects; and in response to determining that the selected one of the plurality of streams of the subset is free of defects, storing an indication that each one of the plurality of streams of the subset is free of defects.

17. The computer-implemented method of claim 16, further comprising:

calculating hash values for each one of the images captured at the common time;

determining that the hash values calculated for each one of the plurality of images are within a threshold distance of one another; and in response to determining that the hash values calculated for each of the plurality of images are within the threshold distance of one another, determining that the plurality of the images captured at the common time are similar to one another.

18. The computer-implemented method of claim 16, wherein determining that the plurality of the images captured at the common time are similar to one another comprises:

calculating signal-to-noise ratios between a first image of a first one of the streams and images of each one of the other streams;

determining that a peak signal-to-noise ratio of the signal-to-noise ratios is between the first image and a second image of a second one of the streams; and in response to determining that the peak signal-to-noise ratio of the signal-to-noise ratios is between the first image and the second image, determining that each of the first image and the second image was captured at the common time.

19. The computer-implemented method of claim 16, wherein determining that the selected one of the plurality of streams of the subset is free of defects comprises:

determining that the selected one of the plurality of streams of the subset is not experiencing a loss of video;

determining that the selected one of the plurality of streams of the subset is not experiencing block corruption;

determining that the selected one of the plurality of streams of the subset is not experiencing a frozen video stream; and determining that the selected one of the plurality of streams of the subset does not include any artifacts.

20. The computer-implemented method of claim 16, wherein the images received from the at least one media source is associated with of at least one of:

a movie;

a news broadcast;

a sporting event; or a television show.

* * * * *